Figure 1:
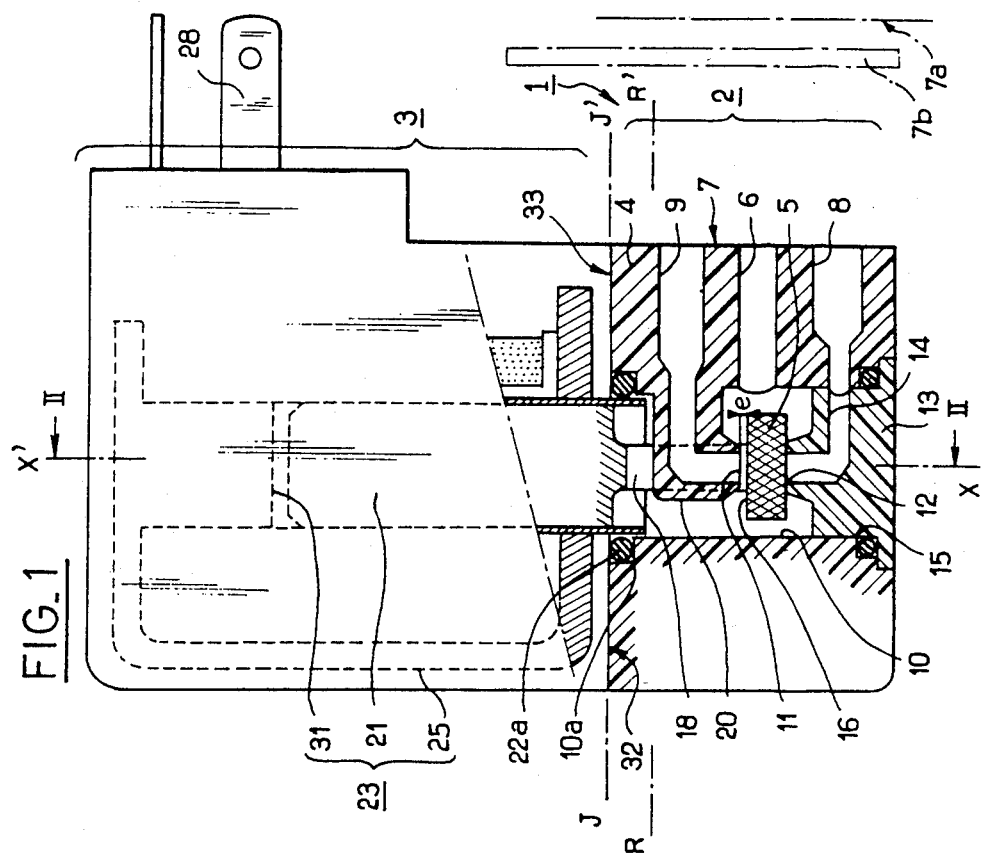

United States Patent [19]

Lèpine et al.

[11] Patent Number: 4,739,966

[45] Date of Patent: Apr. 26, 1988

[54] SMALL TAMPER-PROOF ELECTRICALLY OPERATED VALVE

[75] Inventors: Michel Lèpine, Herblay; Michel Nicolas, Neauphle Le Chateau; André Vergez, Villennes Sur Seine, all of France

[73] Assignee: La Telemecanique Electrique, Nanterre Cedex, France

[21] Appl. No.: 88,226

[22] Filed: Aug. 24, 1987

[30] Foreign Application Priority Data

Sep. 15, 1986 [FR] France ................................ 86 12853

[51] Int. Cl.⁴ .............................................. F16K 31/06
[52] U.S. Cl. .......................... 251/129.15; 137/625.65; 403/155; 403/316
[58] Field of Search ............. 137/625.65; 251/129.15; 403/154, 155, 316

[56] References Cited

U.S. PATENT DOCUMENTS 4,552,179 11/1985 Tarusaka .

FOREIGN PATENT DOCUMENTS 2540751 4/1976 Fed. Rep. of Germany .
650320 7/1985 Switzerland .

Primary Examiner—Gerald A. Michalsky
Attorney, Agent, or Firm—Murray and Whisenhunt

[57] ABSTRACT

A small electrically operated valve in which a control solenoid sub-assembly is mechanically associated in a non-dismantleable fashion by means of a face with the corresponding face of a pneumatic switching sub-assembly having a valve member. Each of the two sub-assemblies is of plastics material and comprises passage portions which may be brought into aligned relationship to form at least one aligned passage capable of receiving at least one small cylindrical metal pin, a first end thereof being positioned below the surface at which the entry of the aligned passage opens, while the other end is in the vicinity of a metal protective portion which is positioned inaccessibly in either one of the two sub-assemblies and which is disposed substantially transversely to the axis of said aligned passage.

7 Claims, 4 Drawing Sheets

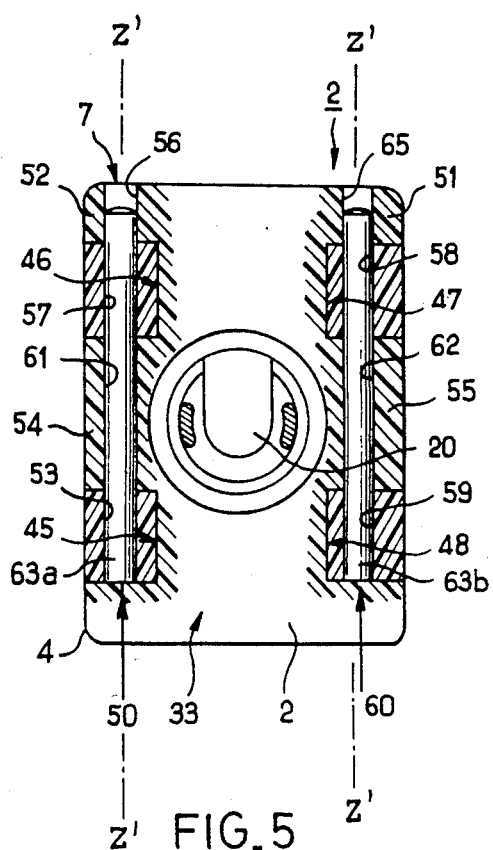
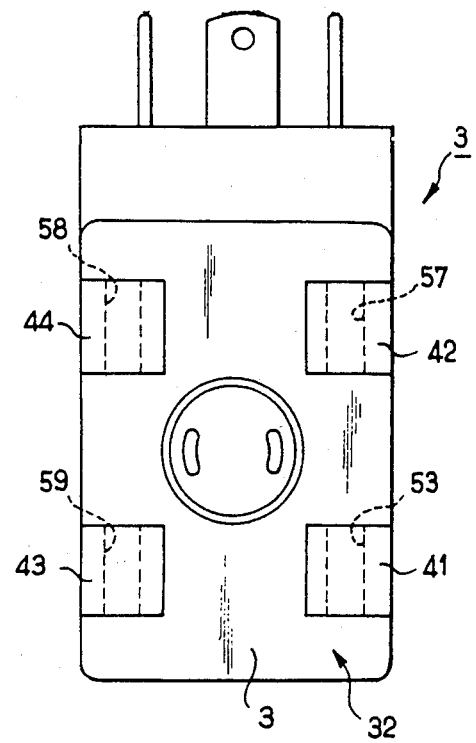
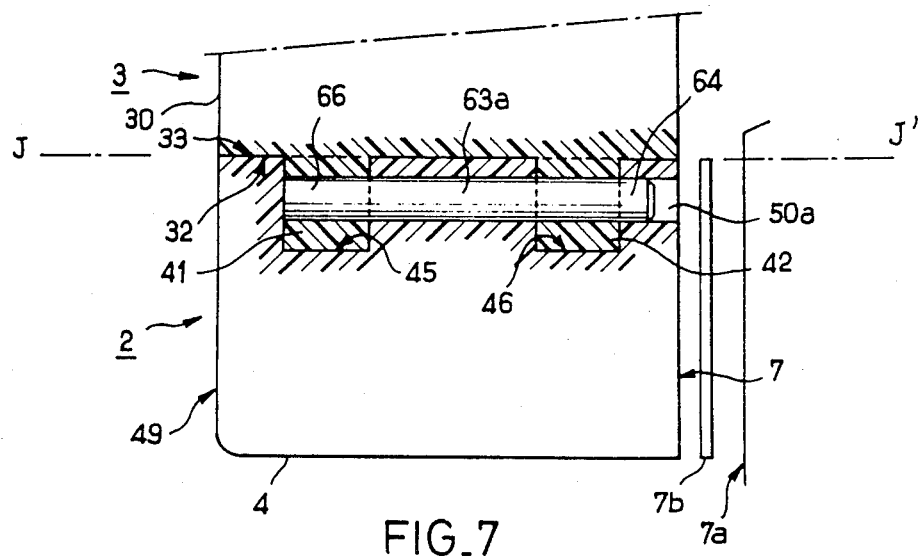
FIG_5    FIG_6    FIG_7

SMALL TAMPER-PROOF ELECTRICALLY OPERATED VALVE

The invention concerns a small electrically operated valve in which a solenoid control sub-assembly is mechanically associated with a pneumatic switching valve sub-assembly dismantleably so that any external intervention cannot alter the dimensional relationships established between a plunger core of the solenoid and the valve member of the valve.

Electrically operated valves are already known whose general structure corresponds to that set forth above and in which the dismantleable character of the association is achieved by crimping of two co-operating components. When the dimensions of such electrically operated valves become small, such an operation is disadvantageous by virtue of the level of precision that it requires and the size of the means which have to be used to carry out that operation.

It has been proposed that glueing operations or ultrasonic welding may be used, which in turn suffer from known disadvantages such as the need to carry out a preliminary cleaning operation or the need to provide a supply of energy which is compatible with possible variations in the quality of the plastics materials used.

When attention is directed towards the association means which are most widely known such as rivets, screws, keys or pins, it is found that the simplicity of the design thereof may lead the user to attempt dismantling and reassembly operations when one or other of the electrically operated valves which he is using or which he has available suffers from a defect. Such operations which are obviously advised against, when considering apparatuses of conventional sizes, must be absolutely proscribed when the reduction in dimensions causes production tolerances to play a relatively more important part, failing which alterations in the operating characteristics aiming to establish reliability of operation of an automation system would give rise to the risk of causing breakdowns.

On the scale of the dimensions in question, the effects of such tolerances are in fact frequently compensated for, either by an adjustment which is carried out in the factory or by virtue of preliminary pairing of certain components.

Dismantling and re-assembly of components which have been previously assembled or, to an even greater degree, an association of separate components coming from two different pieces of equipment must therefore be made entirely impossible.

The invention therefore seeks to provide assembly means for the two main sub-assemblies of a small electrically operated value, which are inexpensive and which are accompanied by steps such as to make it impossible to dismantle them, except by resulting in the apparatus being destroyed.

In accordance with the invention the aim that it seeks to achieve is attained in that each of the two sub-assemblies of plastics material comprises duct portions which are capable of coming into alignment with those of the other to form an aligned duct for receiving at least one small cylindrical metal pin wherein a first end thereof is placed below the surface where the mouth of the aligned duct opens while the other end is in the vicinity of a metal protective member which is placed inaccessibly in either one of the two sub-assemblies and which is disposed substantially transversely to the axis of the aligned duct.

The invention and a number of embodiments thereof will be better appreciated by reference to the following description given purely by way of non-limiting example and which will make it possible to ascertain the advantages and secondary features thereof.

Figure 2:
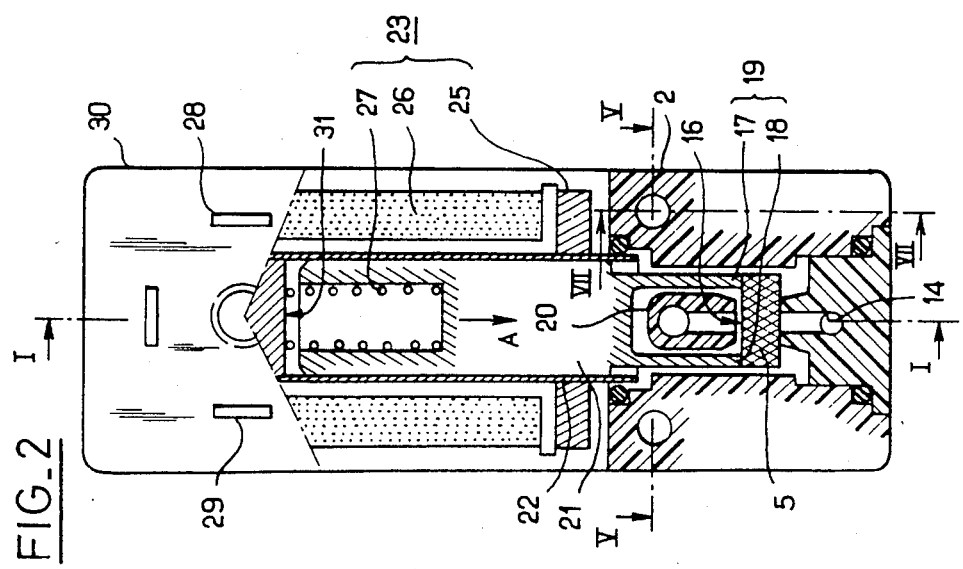
Figure 3:
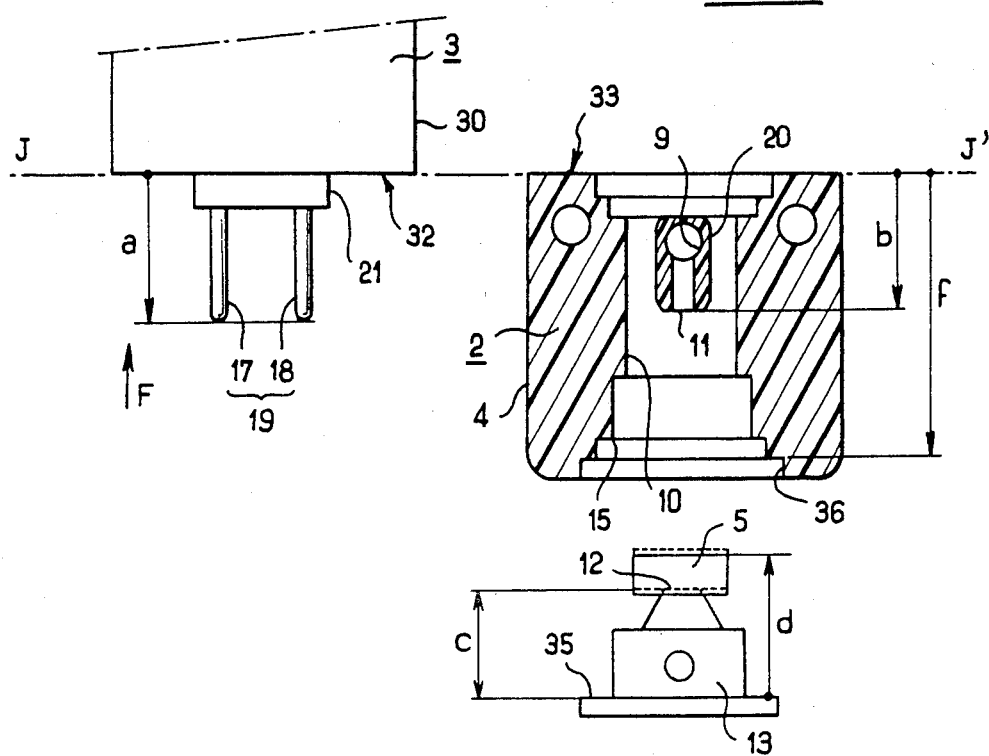
Figure 4:
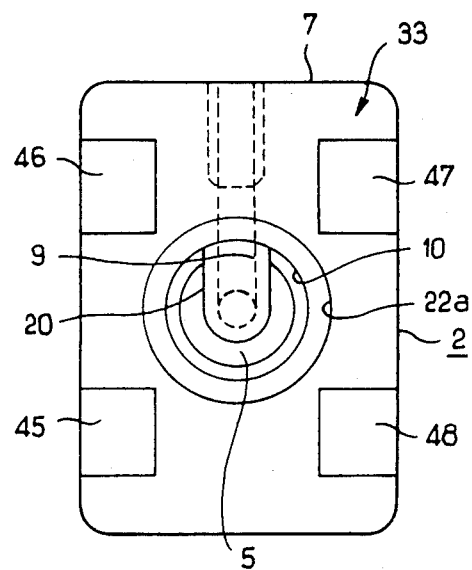
Figure 8:
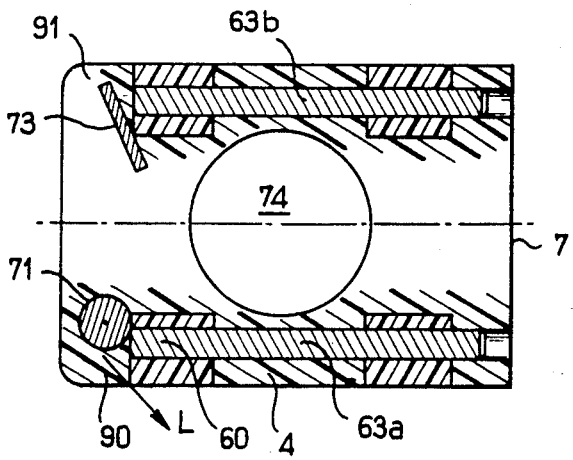
Figure 9:
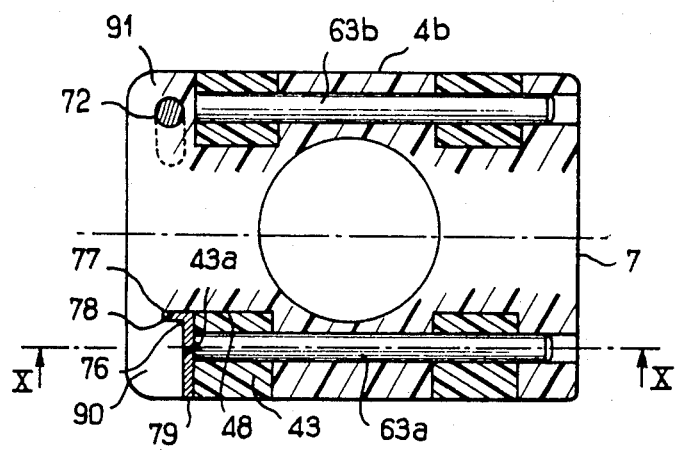
Figure 10:
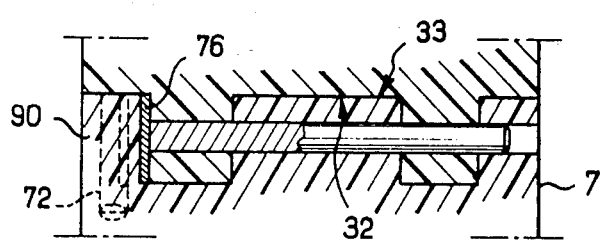
Figure 11:
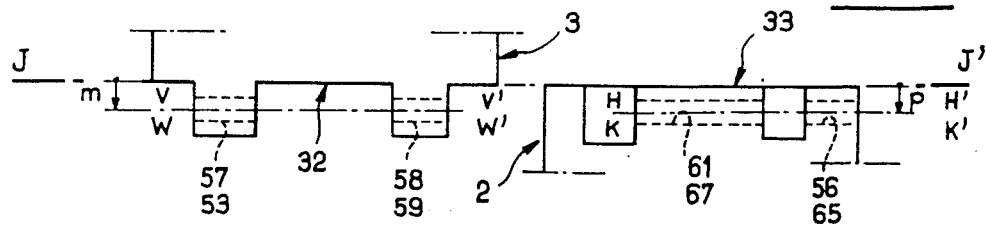

The description is set forth with reference to the accompanying drawings in which:

FIG. 1 is a view partly in section taken along a central plane I—I in FIG. 2 of an electrically operated valve according to the invention, FIG. 2 is a side view of the electrically operated valve of FIG. 1 partly in section along line II—II in FIG. 1, FIG. 3 is a partial view similar to that shown in FIG. 2, in which the constituent elements of the electrically operated valve are shown separately from each other, FIG. 4 is a plan view of the valve member sub-assembly, FIG. 5 is a view in section taken along line V—V in FIG. 2 of the electrically operated valve of the invention, FIG. 6 is a view from below of the solenoid sub-assembly viewing in the direction F in FIG. 3, FIG. 7 is a view partly in section along the line VII—VII in FIG. 2, showing a first embodiment of means for tamper-proof association of the sub-assemblies forming the electrically operated valve according to the invention, FIGS. 8 and 9 are views in section similar to those along line V—V in FIG. 2, illustrating four alternative embodiments of means for tamper-proof association of the sub-assemblies forming the electrically operated valve according to the invention, FIG. 10 is a view in section taken along line X—X in FIG. 9, and FIG. 11 shows the two sub-assemblies of the electrically operated valve at the location of their contact face but displaced relative to each other along their connecting plane to show certain dimensional relationships.

It will be noted that the invention concerns an electrically operated valve 1 which is diagrammatically shown generally in FIGS. 1 and 2, the dimensions of which are of the order of 8 to 15 millimeters.

The electrically operated valve comprises two sub-assemblies 2 and 3 which are associated at the location of the connecting plane JJ' by means which are defined thereinafter.

The first sub-assembly 2 is in the form of a solid block 4 of plastics material in which there is disposed a pneumatic valve system having a valve member 5 which is capable of selectively connecting an outlet duct 6 which opens at a side face 7 of the block 4 to a pressure feed duct 8 and to an exhaust duct 9 which both open in the vicinity of the outlet duct 6 at the same face 7. The face 7 is the face which will be associated with a co-operating face 7a of an item of equipment to be controlled, with the interposition of a seal 7b. The free valve member 5 can be displaced along a line XX' to connect a cylindrical chamber 10 in permanent communication with the duct 6 and in which it is displaced, either to an orifice 11 which leads to the duct 9 or an orifice 12 which leads to the duct 8. The orifice 12 is itself carried by a plug 13 laterally communicating with the duct 8 by way of an internal passage 14 and press-fitted into the intake 15 of the chamber 10.

As can be better seen from FIG. 2 which is a view in cross-section in FIG. 1 on the line XX', the upper face 16 of the valve member receives the ends of two arms 17 and 18 of a fork 19 extending on respective sides of an extension portion 20 of the duct 9 which is perpendicular to the latter, projecting into the chamber 10, and at the end of which the orifice 11 is to be found. If appropriate the fork 19 which is shown here in one piece to simplify the drawing may be attached to the core and may involve materials of different natures.

The fork is fixed with respect to a plunger core 21 which is slidable in an axial case 22 disposed in the second sub-assembly 3. The axial case 22 partially engages by way of its end into the chamber 10 with which it is concentric and a seal 22a disposed in a spot-faced portion 10a provides for sealing of the chamber 10 at the location at which it is closed by the sub-assembly 3. The sub-assembly 3 comprises an electromagnetic attraction device 23 comprising in known manner a yoke 25, a coil 26 which surrounds the case 22 and a return spring 27 for the plunger core 21, the force of which, acting in the direction A, tends to move the core into its rest position.

In the rest position, the valve member is supported against a seat on the plug 13 carrying the orifice 12 which is thus closed. The orifice 11 is open and a small spacing e of the order of a quarter of a millimeter separates the orifice 11 from the upper face 16 of the valve member 5, defining a space through which the outlet duct 6 is connected to the exhaust duct 9.

When a current flows through the coil 26, the current being supplied by means of terminals 28 and 29 which are cast with the fixed components of the solenoid in a body 30 of plastics material forming the casing of the sub-assembly 3, the plunger core is attracted in the opposite direction to A towards the centre of the coil and comes to bear against an abutment surface 31 which is fixed with respect to the yoke 25.

That movement permits the valve member 5 to be freed from the effect of the spring. The valve member then moves into a position of closing the orifice 11 under the effect of the pressure obtaining in the ducts 8 and 14, moving away from the orifice 12 to produce a communication between the orifice 12 and the outlet duct 6.

The connecting plane JJ' is embodied in the solenoid subassembly 3 in the form of a face 32 and on the pneumatic switching sub-assembly 2, in the form of a face 33, when those faces are fitted together.

In order for the electrically operated valve to operate correctly when said faces 32 and 33 are fitted together, a certain number of respective geometric provisons must be met. It will be appreciated, when looking at FIG. 3, that the length a of the arms 17 and 18 as measured from the face 32, the distance b of the seat surrounding the orifice 11 from the face 33, the distance c of the seat surrounding the orifice 12 from a shoulder 35 of the plug 13, the distance f with respect to the face 32 of the bottom of a spot-facing portion 36 receiving the corresponding face of the shoulder 35, are dimensions which are determining factors in regard to proper operation of the electrically operated valve. In fact, they govern on the one hand the travel movement of the valve member 5 and therefore that of the core 22, the degree of compression of the elastomeric material of the valve member 5 in its two positions, and the degree of elongation of the return spring and therefore the force that it develops.

It will be seen therefore that correctly adjusting an electrically operated valve of small dimensions requires either the precise establishment of certain positional dimensions by means of an adjustment operation or the pairing of certain components to take account of the dimensional variations from one component to another in a mass-production situation, within the production tolerances.

Thus for example precise production of the assembly may necessitate initial measurement of the dimension a, the performance of measured machining of the portion 20 to bring the orifice 11 to a dimension b which is compatible with a, and then the introduction into the chamber 10 of a plug 13 and a valve member 5 in respect of which it has been ensured beforehand by pairing that the distance d (see FIG. 3) that they define when they are superposed with a certain force equal to the force of the return spring is itself compatible with a when the shoulder 35 is fitted into the recess 36, having regard to the distance f.

If it is desired that an electrically operated valve of small dimensions retain its properties, it is therefore essential for the various components which make it up to be made non-dismantleable or, if that is not done, any attempt to dismantle the arrangement causes destruction of the apparatus which makes it impossible for it to be re-used.

The association of the two sub-assemblies 2 and 3, with the face 33 against the face 32, as shown in FIGS. 4 to 7, is produced by means of two pairs of prismatic lugs 41, 42 and 43, 44 which are positioned in projecting relationship with respect to the face 32 of the sub-assembly 3 and which engage into two pairs of recesses of corresponding shapes as indicated at 45, 46 and 47, 48, provided under the connecting plane JJ' which passes through the face 33 of the sub-assembly 2; the lugs and recesses are adjacent to two oppositely disposed edges of the faces 32 and 33. The lugs 41 to 44 of the sub-assembly 3 and the portions 51 and 52 externally bordering the recesses 46 and 47 and the portions 54 and 55 of the body 4 which are disposed between the recesses are apertured by passage or duct portions 53, 57, 58 and 59 for the lugs and 56, 61, 62, 65 for the positions of the body 4 which come into mutually facing relationship to form two substantially aligned blind ducts 50 and 60 respectively when the lugs are disposed in the recesses and the faces 33 and 32 bear against each other, as shown in FIG. 5. Those ducts or passages preferably have axes ZZ' which are substantially parallel to the connecting plane JJ'. Two pins 63a and 63b are positioned in the ducts or passages 50 and 60 in such a way that one 64 of their ends is disposed in the entry 50a of the duct or passage 50 and below the level of the face 7 while the other end 66 is in the vicinity of a protective portion. That protective portion which may assume different shapes and locations as can be seen from FIGS. 8, 9 and 10 is of hard metal, passes through the axis of the pin and is provided to cause lateral deflection of a tool such as a pin drift or punch or a drill bit which would be presented on the line of the pins on the side of the face opposite to the face 7 by way of which the pins were introduced.

In FIG. 8 and in the lower region thereof, the protective portion, in a first embodiment, is formed by a ball 71 whose diameter is preferably larger than that of the pin 63a and which is incorporated into the portion 90 of the body 4, which is adjacent to the end of the pin 63a; it will be clearly seen that the pin cannot be extracted from the side of the face 7 nor driven out from the opposite face, nor destroyed by drilling by virtue of the hardness of the ball and/or the lateral sliding movement in the direction L that the tool would exhibit on encountering the ball 71.

The upper part of FIG. 8 illustrates a protective portion formed by a small plate 73 of hard metal which is disposed in the portion 91 which is symmetrical to the portion 90 described above, the plane of which is inclined with respect to the axis of the pin 63b so as to impart to a tool a deflection which directs it towards a delicate region 74 of the apparatus, to cause the destruction thereof.

In the upper part in FIG. 9, an alternative form of the protective portion is formed by a small pin 72 of hard metal which is positioned transversely and inclined with respect to the axis of the pin 63b in the portion 91 of the body 4.

Finally, the lower part of FIG. 9 and FIG. 10 illustrate another alternative form of the protective portion. This is a small plate 76 of hard metal, an edge 77 of which is engaged into a groove 78 adjacent to the recess 48 in the body 4 while the portion 79 thereof, which is perpendicular to the axis of the pin 63a, is housed between the lug 43 of the sub-assembly and a wall 43a of the recess 43, which makes it impossible for it to be extracted when the two sub-assemblies are associated. As the plate 76 is of larger dimensions than the diameter of the pin 63a, it is impossible to try to drift it out.

In an alternative, each of the above-mentioned hard metal plates may be provided in the vicinity of the axis of the pins with an eccentric opening into which a drill bit would take up a stabilised position, to prevent the drill bit from being aligned with the pin.

Finally FIG. 11 diagrammatically shows that the duct or passage portions 53, 57, 58, 59 provided in the lugs of the solenoid sub-assembly (in one piece with the casing body 30 moulded therearound) have axes VV' and WW' spaced from the face 32 by a distance m which is different from the distance p which separates the axes HH' and KK' of the duct or passage portions 56, 61, 62 and 65 provided in the body 4 of the pneumatic connecting sub-assembly 2 between the recesses 45, 46, 47, and 48 and in the portions 51 and 52 thereof. If m is slightly less than p and if the diameter of the pins is slightly less than the diameter of said ducts or passages, alignment thereof will occur under stress upon assembly by means of the pins, forcing the faces 32 and 33 to be effectively and regularly braced against each other.

The invention finds an attractive use in the field of the production of pneumatic components.

What is claimed is:

1. A small electrically operated valve comprising a control solenoid sub-assembly mechanically associated by a face with a face of a pneumatic switching valve sub-assembly having a valve member and being non-dismantleably associated along a connecting plane so that any external intervention cannot alter the dimensional relationships established between a plunger core of said solenoid sub-assembly and the valve member of said valve sub-assembly, each of the two sub-assemblies being made of plastic material and comprising passage portions which are arranged to come into facing relationship to form at least one aligned passage for receiving at least one small cylindrical metal pin, a first end thereof being positioned below a surface at which the entry of the aligned passage opens while the other end is in the vicinity of a metal protective portion, which is positioned inaccessibly in one of the two sub-assemblies and which is disposed substantially transversely to the axis of said aligned passage.

2. A valve according to claim 1 wherein passage portions are provided in prismatic lugs of a body of the solenoid sub-assembly, which engage into recesses in a body of the valve-member bearing valve sub-assembly and which are placed at the periphery of said associated faces of the sub-assemblies.

3. A valve according to claim 1 wherein the surface at which the aligned passages open is a fixing face which is fitted against the surface of a controlled item of equipment.

4. A valve according to claim 1 wherein the protective portion is a ball.

5. A valve according to claim 1 wherein the protective portion is a pin.

6. A valve according to claim 1 wherein the protective portion is a plate.

7. A valve according to claim 6 wherein the plate is placed in a recess between a lug and a portion of the body of the valve sub-assembly and has retaining means.

* * * * *